June 18, 1963 LE ROY V. OXLEY ETAL 3,094,144
VACUUM ACTUATED BLOCKING VALVE FOR VACUUM CONTROLLED MECHANISM
Filed Jan. 13, 1960 4 Sheets-Sheet 1
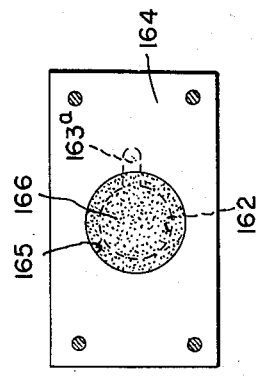
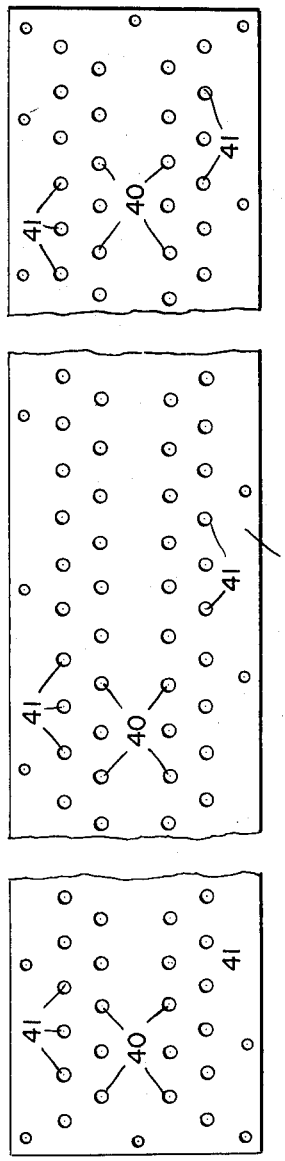
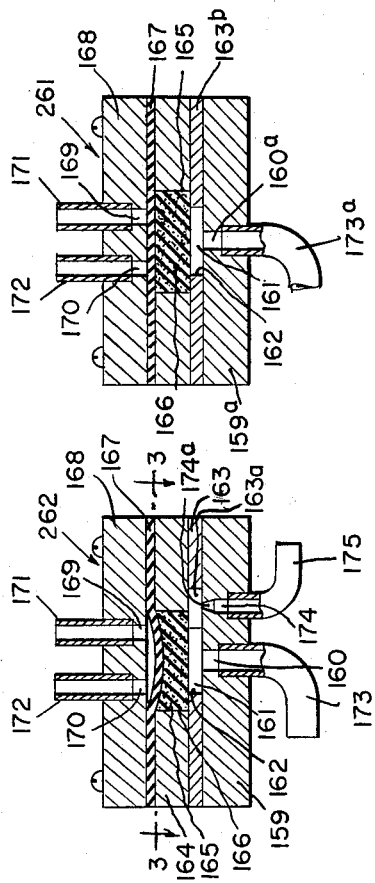
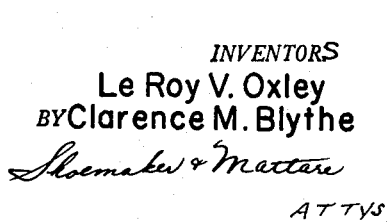
INVENTORS
Le Roy V. Oxley
BY Clarence M. Blythe
ATTYS June 18, 1963    LE ROY V. OXLEY ETAL    3,094,144
VACUUM ACTUATED BLOCKING VALVE FOR VACUUM CONTROLLED MECHANISM
Filed Jan. 13, 1960    4 Sheets-Sheet 2
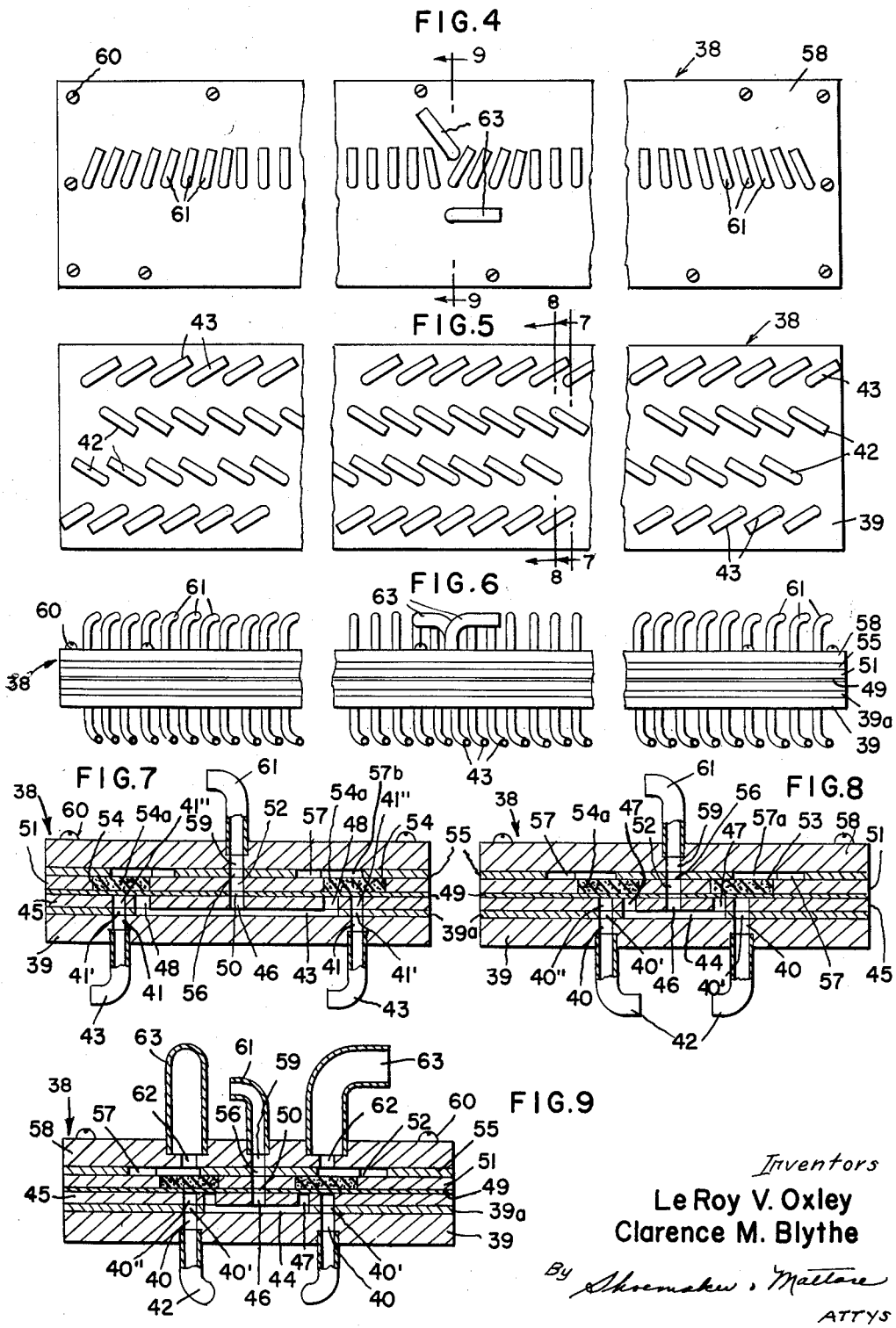
Inventors
Le Roy V. Oxley
Clarence M. Blythe
ATTYS Inventors
Le Roy V. Oxley
Clarence M. Blythe By Shoemaker & Mactare
ATTYS Inventors
Le Roy V. Oxley
Clarence M. Blythe

ATTYS

United States Patent Office 3,094,144
Patented June 18, 1963

3,094,144
VACUUM ACTUATED BLOCKING VALVE FOR VACUUM CONTROLLED MECHANISM
Le Roy V. Oxley, 210 S. Church St., and Clarence M. Blythe, Rte. 5, Box 457, both of Hendersonville, N.C.
Filed Jan. 13, 1960, Ser. No. 2,237
4 Claims. (Cl. 137—609)

This invention relates to a new and novel valve structure designed primarily for use in evacuated vascular systems such, for example, as systems which include or embody the use of vacuum or pneumatically controlled mechanisms.

This application is a continuation in part application based upon and employing subject matter divided out of our application Serial No. 510,791, filed May 24, 1955, now Patent No. 2,967,600 for "Master and Slave Controlled Typing System" etc. and which includes divisible subject matter disclosed and not claimed in our application Serial No. 528,687, filed August 16, 1955 and now patent No. 2,916,128.

In the employment of vacuum or reduced pressure operated mechanisms, or pneumatically operated mechanisms, such, for example, as are illustrated in the above referred to applications, automatically operating valves such as are herein disclosed and claimed are provided for opening and closing evacuated conduits upon introduction of air impulses thereinto to provide for quick and smooth operation of such mechanisms, and it is a particular object of the invention to provide a valve for the purpose stated which reacts quickly to pressure differentials which may be manually or mechanically created upon opposite sides thereof in a conduit in which it is connected.

Another object of the present invention is to provide in a vacuum or pneumatically actuated system a novel valve construction which when closed functions to block the passage of an air impulse between certain other valves or pneumatically operated mechanisms and which in its construction is designed so as to be closed rapidly when vacuum action or a reduced pressure functioning to keep it open is interrupted.

A still further object of the invention is to provide a plurality of vacuum or pneumatically operated blocking valves arranged in a novel multiple or bank assembly whereby control may be switched through the medium of such assembly or bank arrangement from a master typing or printing mechanism to a selected one of two or more vacuum or pneumatically actuated typing or printing machines which are constructed to have the typing or printing elements thereof actuated by vacuum in response to the actuation of corresponding typing or printing elements, or keys, of the master machine.

In its simplest embodiment the pneumatically actuated blocking valve of the present invention embodies a thin flexible diaphragm having a normally closed position in which it overlies and closes adjacent ends of two conduits while upon the opposite side of such diaphragm a chamber is provided which is adapted to be maintained under a vacuum or reduced pressure and which reduced pressure or vacuum will draw the diaphragm away from the adjacent open ends of the said two conduits so that fluid may pass from one of the conduits to the other, as desired. The closing off of the communication between the adjacent ends of the two conduits is effected when an air impulse is introduced into the evacuated line, thereby permitting the diaphragm to return to closed position across the open ends of the adjacent conduits. To supplement the action of the diaphragm in closing, and to cause such closing to occur smoothly and rapidly, the pressure reduction on one side of the diaphragm causes it to be flexed against a resilient body such as sponge rubber, thus placing such resilient body under slight compression so that when the evacuated line is opened and an air impulse introduced thereinto, the resilient body will be permitted to quickly return to its normal form and thus cause the diaphragm to rapidly return to the position in which it closes off the open ends of the adjacent conduits and by reason of the use of a flexible diaphragm together with a soft resilient non-metallic body, the action of the valve is not only smooth and rapid but is noiseless.

The invention will be best understood from a consideration of the following detail description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

FIG. 1 is a view in section through a unitary valve constructed in accordance with the present invention and showing a pair of nipples for connecting the vacuum line to the valve and for passing the vacuum to a unit in association with which the valve is adapted to be used;

FIG. 2 is a sectional view of a modified form of the unitary valve showing only a single vacuum nipple therefor;

FIG. 3 is a sectional view taken substantially on the line 3—3 of FIG. 2;

FIG. 4 is a view in top plan of a bank assembly of blocking valves embodying a plurality of unitary valves corresponding to those shown in FIGS. 1 and 2 with portions of the assembly broken away;

FIG. 5 is a bottom plan view of the valve bank shown in FIG. 4 with portions broken away and illustrating tube connection nipples for a double row or double bank of valves;

FIG. 6 is a view in side elevation of the bank structures of FIGS. 4 and 5 with portions broken away;

FIG. 7 is a transverse section taken substantially on the line 7—7 of FIG. 5;

FIG. 8 is a transverse section taken substantially on the line 8—8 of FIG. 5;

FIG. 9 is a transverse section taken substantially on the line 9—9 of FIG. 4;

FIG. 16 is a plan view of the bottom plate with portions broken away.

Figure 10:
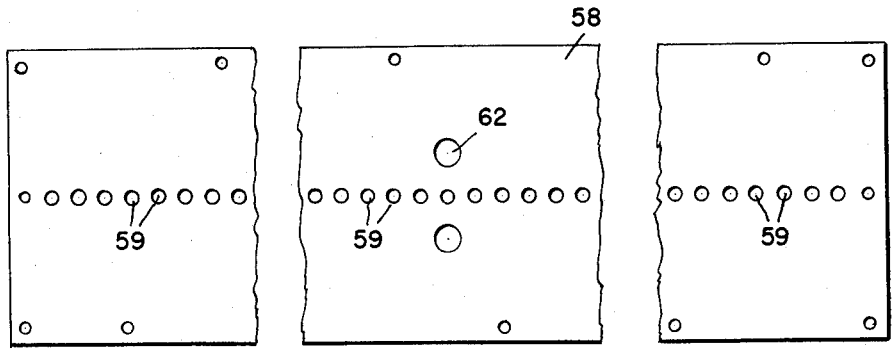
FIG. 10 is a plan view of the top plate of the bank assembly with portions broken away.

In the hereinbefore referred to application Serial No. 510,791, now Patent No. 2,967,600, there is disclosed a master and slave control typing system together with certain structural units for use therein. Among such structural units are blocking valves such as are illustrated in FIGS. 1, 2 and 3, which function to shut off communication between a pair of conduits or passageways upon the introduction of an atmospheric air impulse into a vacuum line and which, upon reimposition of vacuum on a line, re-open or re-establish communication between a pair of conduits. These unitary blocking valve structures are set up, as hereinafter more particularly described, in multiple in a novel arrangement whereby a multiplicity of conduits may be opened and closed by the establishment of vacuum in the individual units or by destroying such vacuum by introduction of an air impulse into the vacuum line.

These unitary valves shown in FIGS. 1 and 2, with a section of one thereof forming FIG. 3, are designated by the reference numerals 261 and 262 which reference numerals corresponds to reference numerals 61 and 62 respectively of the structures shown in Patent No. 2,967,600.

In the further description of these unitary valves the same reference characters will be employed as are employed in the application from which they have been divided.

As previously stated, these valves 261 and 262 are blocking valves forming a part of the control system of the parent application. These valves are essentially of the same form of construction with the exception that the one shown in FIG. 2 and designated 262 is provided with a vacuum bleed connection communicating with the same chamber beneath the diaphragm as the control nipple hereinafter identified.

In the valve structures there is a bottom plate 159 identified as the control plate which, preferably, is of metal and which has an aperture 160 therethrough leading into a control chamber 161 which is formed by an aperture 162 formed in the central portion of a gasket 163. Overlying and resting upon the gasket 163, is a spacer plate 164 which is preferably of metal and which has formed centrally therein an opening 165 of larger diameter than the opening 162 which forms a pocket for a sponge rubber block or filler 166. As shown, the thickness of this sponge rubber block or filler is the same as that of the space plate and the filler rests upon the gasket 163 and has its top surface flush with the top surface of the spacer plate.

Overlying the top of the spacer plate and filler block of sponge rubber is a diaphragm 167 of leather or other suitable material, and resting upon the top of this diaphragm is the top or impulse plate 168 through which are formed two passages 169 and 170 both of which open through the bottom face of the impulse plate within the area defined by the sponge rubber filler block.

For convenience of description, the passage 169 will be identified as the input passage and passage 170 will be identified as the output passage, and each of these passages has fixed therein a nipple to facilitate the connection of an air tube therewith, the input nipple being designated 171 and the output nipple designated 172.

The passage 160 has a nipple 173 connected therewith to facilitate the attachment of an air tube for communication with the chamber 161.

In this embodiment of the blocking valve, the gasket 163 is provided with a lateral slot 163a and the control plate is provided with an aperture 174 which opens into the slot 163a through a constricted passage 174a while the outer end of the opening 174 has a nipple 175 connected therewith for the attachment of a vacuum line.

This embodiment of the blocking valve shown in FIG. 2 has been hereinbefore referred to and generally identified with the reference character 262. The simpler embodiment of the blocking valve which is here designated generally by the reference character 261, differs from the valve of FIG. 2 only in the fact that the gasket 163b is not provided with the recess 163a of the first embodiment, and the control plate 159a has only a single passage therethrough as indicated at 160a with which is connected an end of the nipple 173a. The other parts of this valve structure being the same as the valve of FIG. 2, the same reference characters are employed for like parts.

Referring further to the form of the unitary valve shown in FIG. 1, it will be seen that the valve has the movable parts thereof in closed position. Such movable parts comprise a portion of the diaphragm 167 and of the sponge rubber filler block 166. As closed, the diaphragm 167 will shut off communication between the ports or passages 169 and 170, but it will be seen that when a suitable exhaust mechanism or exhaust pump is connected with the nipple 173 or 173a, pressure will be reduced in the control chamber 161 and the portion of the diaphragm 167 overlying the opening or recess 165 in which the filler block is located, will be pulled down in the manner in which the corresponding diaphragm in FIG. 2 is illustrated thus establishing communication between the passages or ports 169 and 170. This depression of the portion of the diaphragm will create a corresponding depression in the top of the filler block thus placing the latter under resilient tension and upon the admission of an air impulse to the nipple 173 or 173a whereby to break the vacuum, which break may be either momentary or permanent, the compressed block 166 will react together with the depressed portion of the diaphragm thus moving the latter back into closing position across the ports 169 and 170.

Upon referring to FIG. 2, it will be realized that the same action will be accomplished in the valve unit 262 upon the connection of a reduced pressure creating means or vacuum pump with the nipple 175 which communicates through the port 174 with the control chamber 161, which communication is by way of the constricted passage 174a. The additional nipple here designated 173, provides means for connecting the vacuum creating means with another pneumatically operated unit.

The multi-unit structure illustrated in FIGS. 4 to 16 embodies or constitutes the connection in a novel manner of a multiplicity of unitary valves similar to that shown in FIGS. 1 and 2. This multi-unit structure, here illustrated as two banks of blocking valves, is embodied in the system disclosed in application Serial No. 528,687 now Patent No. 2,916,128, for facilitating the control by a single manually operated typewriter or bank of key members, as may be desired, for selectively controlling the operation of two or more pneumatically operated typewriting machines.

In the following description of the construction and operation of the two bank blocking valve unit shown in FIG. 4 and succeeding figures, the same reference characters are employed as are used in the description of these structures in Patent No. 2,916,128.

Referring now more particularly to the structures of FIGS. 4 to 16, the numeral 38 generally designates a two bank blocking unit which is shown in FIGS. 4, 5 and 6 in top, bottom and side elevation, respectively, and in transverse section in FIGS. 7, 8 and 9. Each of the two banks of blocking valves serves one robot machine and in the two bank unit illustrated there is one air impulse line connection which is common to a valve in each of the two banks so that the actuation of a key of the master manually operated typewriter will send an air impulse to such common connection to pass through one or the other of the two blocking valves with which such common connection is associated depending upon which of the two valves is open so that such air impulses will be properly routed to the correct robot machine.

The two bank blocking valve unit comprises a long flat bottom plate 39 through which are formed two inner rows of apertures 40, FIG. 16, extending longitudinally thereof on opposite sides of the longitudinal center, and two outer rows of apertures 41 which are in staggered relation with the apertures of the inner rows. These inner and outer rows of apertures have connected therewith the inner and outer nipples 42 and 43 respectively, see FIG. 5.

Figure 15:
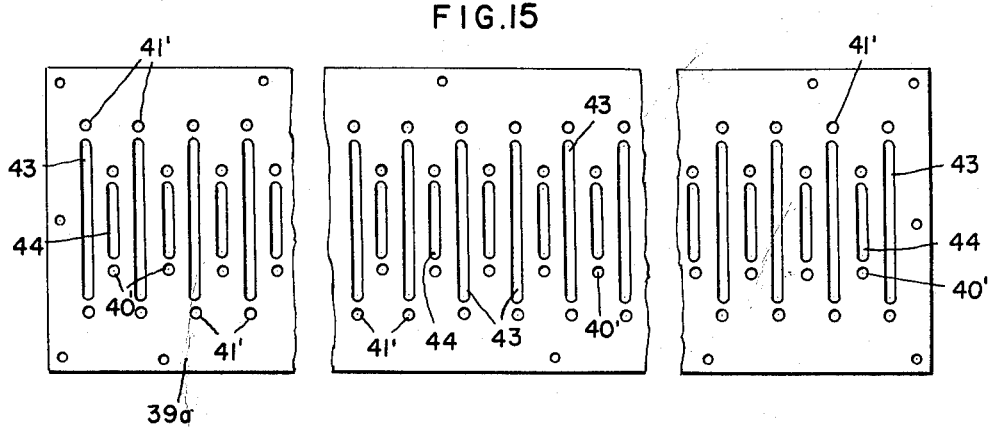
FIG. 15 is a plan view of the gasket strip overlying the the bottom plate with portions broken away.

Overlying the bottom plate 39 is a gasket strip or sheet 39a, FIG. 15, of suitable gasket material, in which are formed the inner longitudinal rows of apertures 40′ and the outer longitudinal rows of apertures 41′. These apertures 40′ and 41′ are positioned to align with the apertures 40 and 41 of the bottom plate.

In addition to the apertures 40′ and 41′ the gasket 39a has the alternating transversely directed long and short slots 43 and 44, the long slots lying between the transversely aligned outer apertures 41' while the shorter slots lie between the transversely aligned or spaced inner apertures 40'. These transverse slots 43 and 44 provide for the transmission of air impulses alternately to one or the other of two transversely spaced blocking valves as will be hereinafter fully disclosed.

Overlying and resting upon the gasket 39a is an impulse plate 45. See FIG. 14.

The impulse plate 45 has a single central longitudinal row of fifty-two apertures 46. At each side of this central row of apertures 46 are two longitudinal rows of apertures. These apertures of the two rows are in alignment transversely of the plate with a central aperture 46 and the apertures of the innermost row are designated 47 while those of the adjacent row lying outside of the apertures 47 are designated 40'' and are positioned to align with the hereinbefore described aligned apertures 40 and 40'. The apertures 47 each opens into or registers with an end of a short cross slot 44 as shown in FIGS. 8 and 9.

Lying outside of the two rows of apertures 40'' and 47 are two outer rows. The apertures of the innermost one of these two outer rows are designated 48 while the apertures of the outermost ones of these outer rows are designated 41''. The apertures 41'' are positioned to align with apertures 41 and 41' while the apertures 48 each registers with an outer end of a long cross slot 43 in the gasket 39a, as illustrated in FIG. 7.

Lying over and upon the top of the impulse plate 45 is a leather sheet or actuating diaphragm 49 formed or consisting of pouch leather or any other suitable material. This actuating diaphragm is provided with a central longitudinal series of apertures 50 totaling fifty-two in number and positioned to align with the apertures 46 of the underlying impulse plate. This actuating diaphragm covers the upper ends of the apertures or ports 40'' or 41'', 47 and 48 when the top surface of the diaphragm is subjected to atmospheric pressure and therefore when the diaphragm is in this closed position no air impulse can pass from the apertures or ports 47 across to the adjacent apertures 40'' or from the apertures or ports 48 across to the adjacent apertures 41''.

Lying over and upon the diaphragm 49 is the spacer plate 51. See FIG. 12. This plate has a central longitudinal row of apertures 52 therethrough bordered on each side by the inner longitudinal row of spacer openings 53 and an outer row of corresponding spacer openings 54. The inner openings 53 overlie the ports or apertures 40'' and the outer openings 54 overlie the ports or apertures 41'' as shown in FIGS. 7 and 8.

Figure 11:
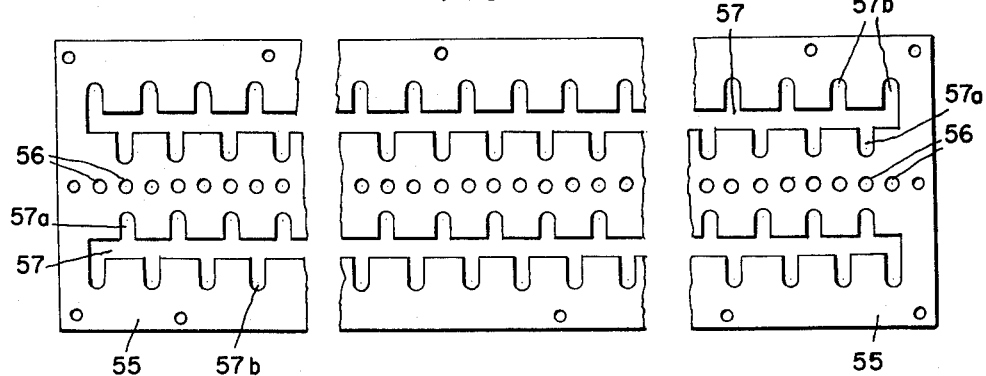
FIG. 11 is a plan view of the gasket having longitudinal exhaust slots therein with portions broken away.
Figure 12:
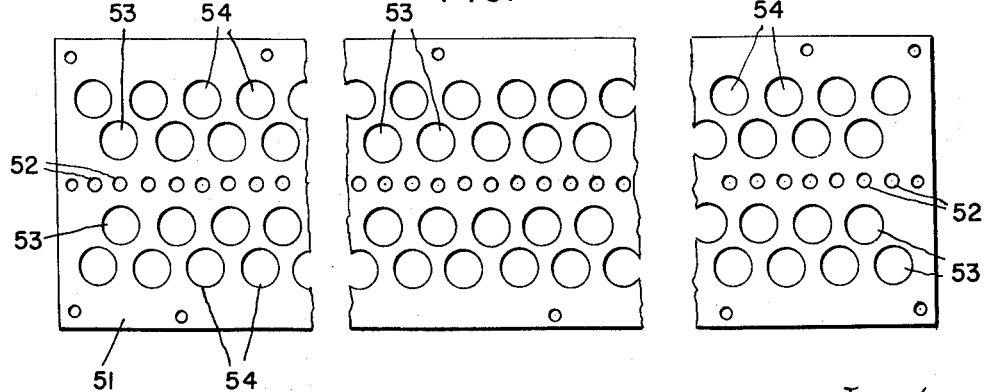
FIG. 12 is a plan view of the spacer plate with portions broken away.
Figure 13:
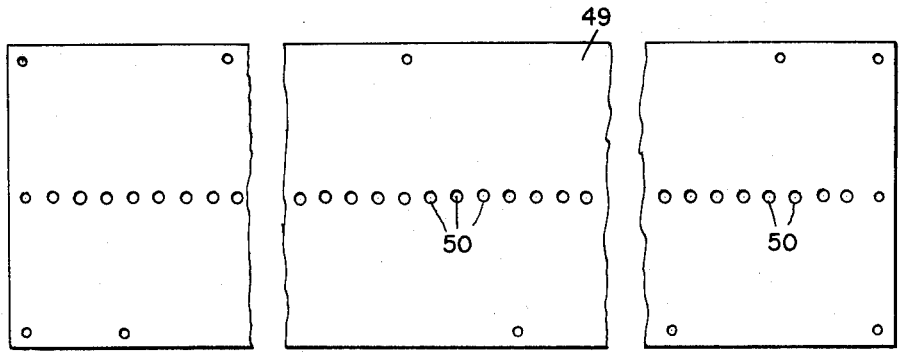
FIG. 13 is a plan view of the diaphragm with portions broken away.
Figure 14:
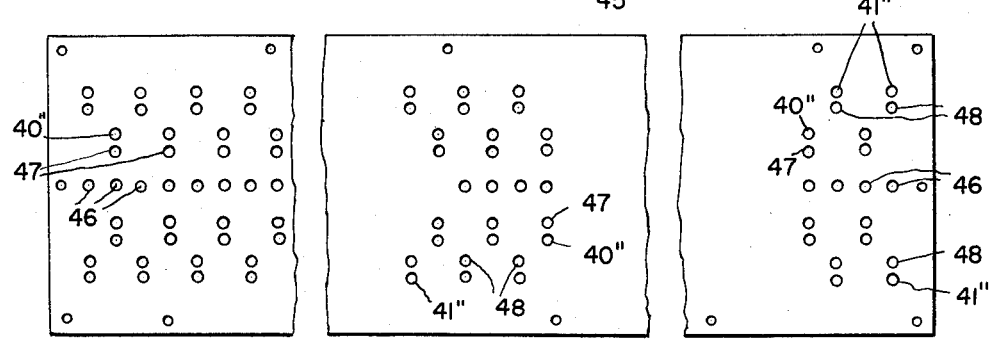
FIG. 14 is a plan view of the impulse plate underlying the diaphragm with portions broken away.

The numeral 55 designates a gasket, refer to FIG. 11, having a central longitudinal row of apertures 56 formed therethrough. At each side of this row of apertures is a longitudinal exhaust slot 57. Each of these slots 57 along its inner side communicates with the short inwardly directed vestibule slots 57a which are in alignment across the gasket and each of which lies beneath an inner opening 53, as illustrated in FIGS. 8 and 9.

In addition to the slots 57a, each longitudinal slot 57 communicates along its outer side with the short outwardly directed vestibule slots 57b which are also in alignment across the gasket but are out of alignment, or in staggered relation, with the slots 57a. Each of these vestibule slots 57b overlies an outer opening 54, as illustrated in FIG. 7.

Each of the inner and outer openings 53 and 54 in spacer plate 51 has fitted therein a resilient disc 54a. These discs are preferably of sponge rubber, or other material having like characteristics of resiliency which would be suitable to perform the desired action or function in the blocking valve structure. As shown in FIGS. 7, 8 and 9 each disc lies beneath a vestibule slot 57a or 57b and rests upon the underlying diaphragm 49.

The numeral 58 designates a top plate, see FIG. 10, which has formed therethrough the central longitudinal row of apertures 59 each of which aligns and communicates with the apertures 46, 50, 52 and 56 respectively of the impulse plate 45, the spacer plate 51 and the exhaust gasket 55. These aligned and communicating apertures communicate with the cross slots 43 and 44.

All of the plates, gaskets and the actuating diaphragm are secured together to form the unit by means of bolts or screws 60 which are passed through suitable openings in the several plates, gaskets, etc.

In addition to the central longitudinal row of apertures 59 in the top plate, in each of which is secured an end of a nipple 61, the top plate has formed therethrough the two exhaust line openings 62 in each of which is secured an end of a nipple 63 and each of these openings 62 is in communication with an exhaust slot 57 as shown in FIG. 9.

As set forth in Patent No. 2,916,128, from the application of which the two bank valve unit structure of this application was divided out, the structure is for use in the operation of keys of a typewriter and, therefore, there are 52 of the top plate apertures 59 and nipples 61 and in each of the two banks of blocking valves there are 52 openings in the bottom plate 39 which are divided into an inner row of 26, designated 40, and the adjacent outer row of 26, designated 41. See FIG. 16.

As previously stated, each bank of blocking valves consists of fifty-two valves.

Each valve embodies, referring to either side of FIG. 7, aligned ports 41, 41', 41'', port 48, slot 43, ports 46, 50, 52, 56 and 59, the air exhaust channel 57, opening 54, diaphragm 49 and a sponge rubber disc 54a.

When vacuum is applied to either exhaust slot 57, in the exhaust gasket 55, by way of a nipple 63, the diaphragm 49 lying under the two rows of openings 53 and 54 of the bank of valves will be drawn up into the openings against the resistance of the sponge rubber discs therein, each of which discs underlies a lateral extension of the vacuum passage or exhaust slot 57. Thus all of the blocking valves of the one bank will be opened by providing a space under each drawn up portion of the diaphragm for the passage of an air impulse through a nipple 61, across between two adjacent ports 48—41', or 47—40', respectively, to a nipple 43 or 42.

In the use of the two bank multi-valve structure of the present application for actuating a pair of pneumatically operated machines, such, for example, as pneumatic or vacuum operated typewriters, by means of a single control keyboard, the nipples 63 have vacuum lines connected therewith and means is provided for selectively coupling a vacuum creating means with either of such lines. Accordingly when one of such vacuum lines is shut off from the vacuum creating means and the other line has the vacuum means operatively connected therewith, one bank of blocking valves will be prepared for use and the nipples 42 and 43 of such bank will be connected by appropriate tubing with the machine to be controlled from the keyboard. When the selected nipple 63 is coupled with the vacuum creating means, the portion of the diaphragm 49 associated with all of the bank of valves in use, together with the sponge rubber block 53 of each of the valve units of that bank which is under vacuum and in use, will be drawn away from the ends of the passages 47—40' or 48—41'' so that when a selected key of the control keyboard is actuated to permit the introduction of an air impulse to one of the nipples 61 such air impulse will pass through from one of the ports to the other, that is, from the adjacent or associated ports 47—40' or 48—41'' and through the associated nipple to that element of the machine under control which corresponds to the key element of the control machine or control keyboard.

When the control is to be switched from the first machine to another machine connected with the second bank of valve units, the vacuum creating source will, of course, be shut off from the bank of valve units previously in use and will be connected with the nipple 63 of the other bank of valve units which had previously been out of operation so that the second machine connected with the second bank of valve units can be controlled in the same way from the same control machine or control keyboard.

We claim:

1. A vacuum operated valve comprising a body having a first, second, third and fourth plates arranged in superposed relation, the first plate having two ports therethrough in closely spaced relation, the second plate having a relatively large opening therethrough toward which said ports are directed, the third plate having an opening therethrough of smaller size than the second plate opening and communicating with the second plate opening, the fourth plate having a fluid port therethrough communicating with the opening in the third plate, said first and second plates having parallel opposing faces, a diaphragm secured between said opposing faces and covering the opening in the second plate, and a soft resilient body filling the opening in the second plate and having a top surface coplanar with the said surface of the second plate and engaging and supporting the diaphragm over the opening in the second plate and said diaphragm and the top of the resilient body being joined whereby the application of reduced pressure to the opening in the third plate by way of the port in the fourth plate will effect the contraction of said resilient body to draw the diaphragm away from said pair of ports for the establishment of communication between the ports, and means securing said plates and diaphragm compactly together.

2. The invention according to claim 1, wherein said soft resilient body is sponge rubber.

3. The invention according to claim 1, wherein said fourth plate has a second port therethrough opening through a constricted inner end portion into the opening in the third plate.

4. A vacuum operated plural valve construction for selectively directing fluid flow to a multiplicity of fluid lines, said construction embodying first, second, third, fourth and fifth elongate plates disposed in superposed relation, a diaphragm interposed between faces of the third and fourth plates, said first, second, third and fourth plates and the diaphragm each having a longitudinal row of openings therethrough, the openings of said first, second, third and fourth plates and the diaphragm being aligned to form individual fluid inflow passages, said first plate having an opening therethrough for connection with a source of vacuum, said second plate having a longitudinal slot therein and extending therethrough adjacent to and parallel with the said longitudinal row of fluid inflow passages, said slot being bordered on opposite sides by laterally extending staggered vestibule portions, said third plate having two parallel longitudinal rows of relatively large openings therethrough, each of said relatively large openings in the third plate communicating directly with one only of said vestibules of said longitudinal slot and being covered on the side opposite from the vestibule by said diaphragm, said fourth plate having two longitudinal rows of outflow ports therethrough, means forming a plurality of flow distributing passages extending in a transverse direction with respect to and located between the fourth and fifth plates and said plurality of flow distributing passages being spaced apart longitudinally of the plates, each of said flow distributing passages being in communication with a fluid inflow passage, there being a terminal port for and at one end of each of said flow distributing passages, each terminal port being formed through the fourth plate and each terminal port being disposed adjacent to an outflow port to form therewith a coacting pair of ports, each coacting pair of ports being covered and closed by the diaphragm, said fifth plate having two longitudinal rows of ports therethrough each communicating with an outflow port of the fourth plate, and a resilient body filling each of the said relatively large openings in the third plate and covering one vestibule of the air channel and each of said resilient bodies being secured to the adjacent surface of the diaphragm over the port thereof closing a cooperating pair of ports whereby a vacuum established in the air channel effects contraction of all of the resilient bodies and withdrawal of the diaphragm from the adjacent pairs of ports.

References Cited in the file of this patent

UNITED STATES PATENTS

| | | |
|---|---|---|
| 2,168,351 | Rue | Aug. 8, 1939 |
| 2,181,900 | Langdon | Dec. 5, 1939 |
| 2,335,312 | Rotheim | Nov. 30, 1943 |
| 2,376,918 | Hughes | May 29, 1945 |
| 2,677,390 | Davis | May 4, 1954 |
| 2,807,280 | Kittredge | Sept. 24, 1957 |
| 2,850,038 | Shabaker | Sept. 2, 1958 |
| 2,857,495 | Bourns | Oct. 21, 1958 |
| 2,989,282 | White | June 20, 1961 |